United States Patent
Tohma

(10) Patent No.: US 7,390,997 B2
(45) Date of Patent: Jun. 24, 2008

(54) MICROSCOPE AND AUTO FOCUSING METHOD FOR A MICROSCOPE

(75) Inventor: Ryuichi Tohma, Akashi (JP)

(73) Assignee: Sysmex Corporation, Kobe (JP)

( * ) Notice: Subject to any disclaimer, the term of this patent is extended or adjusted under 35 U.S.C. 154(b) by 0 days.

(21) Appl. No.: 11/540,154

(22) Filed: Sep. 29, 2006

(65) Prior Publication Data

US 2007/0075216 A1    Apr. 5, 2007

(30) Foreign Application Priority Data

Sep. 30, 2005  (JP)  ............... 2005-287982

(51) Int. Cl.
    G02B 27/40    (2006.01)
(52) U.S. Cl. .................. 250/201.3; 359/383
(58) Field of Classification Search ............. 250/201.3; 382/255; 359/391–394, 383
    See application file for complete search history.

(56) References Cited

U.S. PATENT DOCUMENTS

| 4,625,103 A | 11/1986 | Kitamura et al. |
| 4,748,335 A * | 5/1988 | Lindow et al. ......... 250/559.22 |
| 5,351,152 A * | 9/1994 | Kuo et al. ............... 359/376 |
| 5,530,237 A | 6/1996 | Sato et al. |
| 2004/0113043 A1 | 6/2004 | Ishikawa et al. |
| 2005/0280830 A1* | 12/2005 | Rembe .................. 356/511 |

FOREIGN PATENT DOCUMENTS

| JP | 60-162955 | 8/1985 |
| JP | 07-020124 | 1/1995 |
| JP | 07-174962 | 7/1995 |

OTHER PUBLICATIONS

European Search Report for Application No. 06020400 dated Jan. 18, 2007.

* cited by examiner

Primary Examiner—Georgia Epps
Assistant Examiner—Tony Ko
(74) Attorney, Agent, or Firm—Brinks Hofer Gilson & Lione

(57) ABSTRACT

A microscope which comprises: an optical system for magnifying a sample; a focus adjuster for adjusting a focus of the optical system on the sample; an optical detector for detecting light through the optical system; a position estimator for estimating a position of the focus of the optical system, which stays with respect to the sample, based on the light detected by the optical detector while the optical system is vibrating with respect to the sample; and a controller for controlling the focus adjuster based on the position of the focus estimated by the position estimator, is disclosed. An auto focusing method for a microscope is also disclosed.

20 Claims, 8 Drawing Sheets

(a)

(b)

(c)

(b)

(a)

MICROSCOPE AND AUTO FOCUSING METHOD FOR A MICROSCOPE

This application claims priority under 35 U.S.C. §119 to Japanese Patent Application No. JP2005-287982 filed Sep. 30, 2005, the entire content of which is hereby incorporated by reference.

FIELD OF THE INVENTION

The present invention relates a microscope which has an auto focusing function, and an auto focusing method for a microscope.

BACKGROUND

An automatic microscope is used in imaging hematocytes in a sample in which blood is smeared on a slide glass, in imaging sediments in a sample in which sediments in urine are collected and spread over the plate, and in imaging samples in which a cross section of the cell is dyed. The automatic microscope includes a stage that freely moves at least in the XY direction and a microscope for magnifying the specimen of blood cells and the like applied to the slide glass arranged on the stage, and has a detecting function of detecting the object to be observed by moving the stage, and an auto focusing function of adjusting the relative position of the lens of the microscope and the stage to focus the focus of the lens on the specimen on the slide glass.

Such automatic microscope is generally used as an automatic analyzing apparatus equipped with a means for imaging an image of the specimen magnified by the microscope, and an image processing section for processing the imaged image to obtain the desired analysis information (e.g., number of hematocytes for each category) (see e.g., Japanese Patent Application Laid-Open (JP-A) No. 7-20124).

Japanese Laid-Open Patent Publication No. 7-20124 discloses a blood cell analyzing apparatus for categorizing the hematocytes of the blood cells and counting the numbers thereof, the apparatus including a microscope for magnifying the blood cells smeared on the slide glass and a color television camera for imaging the microscope image. The slide glass applied with the blood is mounted on the stage of the microscope. The stage is moved in the XY direction by a stage driving circuit to adjust the position of the slide glass on the stage, and the lens system is moved in the up and down direction (Z-axis direction) by a focus driving circuit to adjust the focusing position by auto focusing. The image from the microscope is imaged by means of the color television camera, and the image of the blood cell is displayed on an RGB monitor.

In the blood cell analyzing apparatus, the position of the slide glass is adjusted by moving the stage, but residual vibration is produced at the stage due to law of inertia when the stage is stopped after position adjustment. If auto focusing is performed before the residual vibration is converged, the focus of the lens cannot be reliably focused on the specimen on the slide glass. Thus, a predetermined time has to be waited until the residual vibration converges, and auto focusing must be performed after the residual vibration is converged. Since the analysis of the blood cell includes imaging of a predetermined number of (e.g., 100) white blood cell, the residual vibration must be waited until converged for each imaging to analyze one specimen, whereby the processing speed of the apparatus becomes low.

SUMMARY OF THE INVENTION

The scope of the present invention is defined solely by the appended claims, and is not affected to any degree by the statements within this summary.

A first aspect of the present invention is a microscope which comprises: an optical system for magnifying a sample; a focus adjuster for adjusting a focus of the optical system on the sample; an optical detector for detecting light through the optical system; a position estimator for estimating a position of the focus of the optical system, which stays with respect to the sample, based on the light detected by the optical detector while the optical system is vibrating with respect to the sample; and a controller for controlling the focus adjuster based on the position of the focus estimated by the position estimator.

A second aspect of the present invention is a microscope comprising: a stage for holding a sample; a stage mover assembly for moving the stage; an optical system for magnifying the sample on the stage; a focus adjuster for adjusting a focus of the optical system on the sample; and a controller for controlling the focus adjuster such that the focus adjuster starts adjusting the focus of the optical system on the sample while the optical system is vibrating with respect to the sample by a movement of the stage.

A third aspect of the present invention is an auto focusing method for a microscope, comprising: locating a sample under an optical system for magnifying the sample; estimating a position of a focus of the optical system with respect to the sample, while the optical system is vibrating with respect to the sample; and adjusting a focus of the optical system on the sample based on the estimated position of the focus of the optical system.

DETAILED DESCRIPTION OF THE PREFERRED EMBODIMENTS

The preferred embodiments of the present invention are described hereinafter with reference to the drawings.

Figure 1:
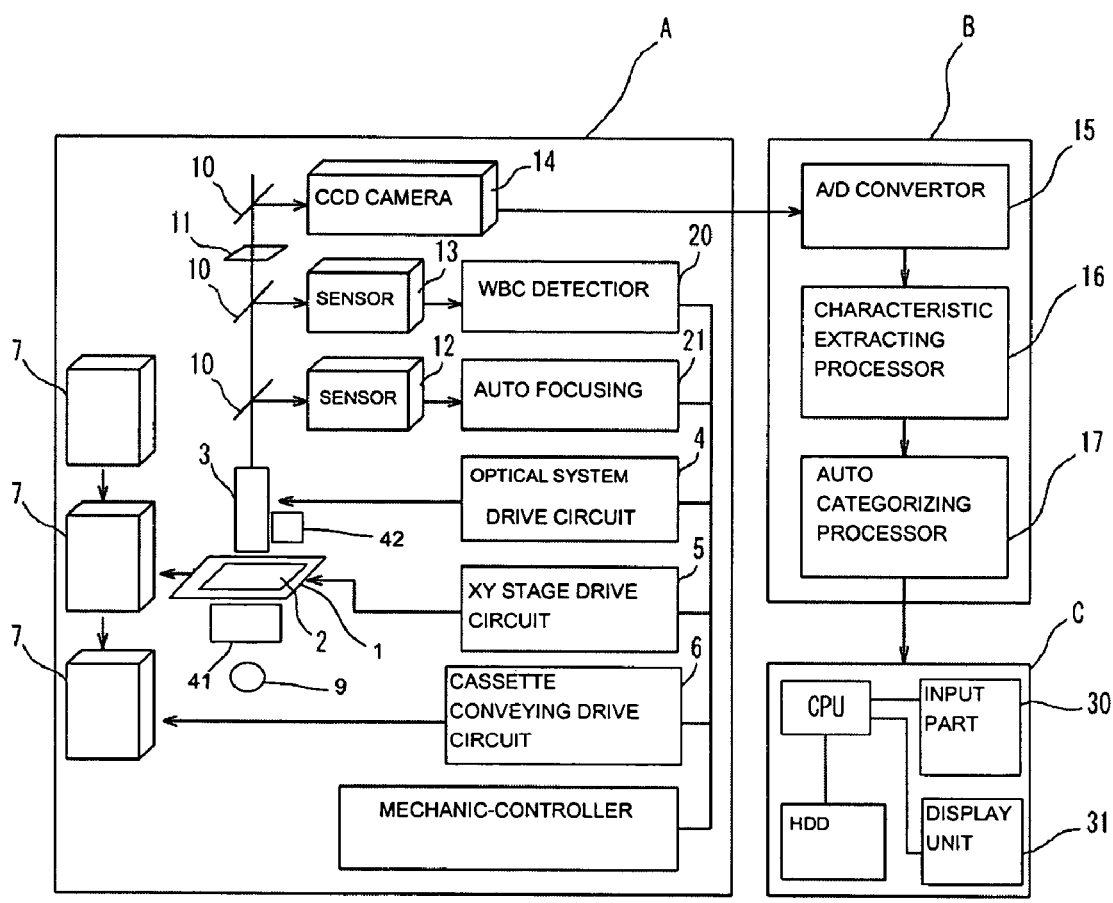
FIG. 1 is a block diagram showing a configuration of a blood sample analyzing apparatus including one embodiment of an automatic microscope of the present invention.

FIG. 1 is a block diagram showing the configuration of a blood sample analyzing apparatus including an automatic microscope according to one embodiment of the present invention. FIG. 1 shows the configuration of the apparatus in frame format view, where the arrangement of the sensor, the slide cassette etc. is slightly different from the actual arrangement for the sake of simplicity. For example, the sensor for WBC detection and the sensor for auto focusing are arranged in the vertical direction in FIG. 1, but both sensors are actually arranged in substantially the same plane as shown in FIG. 3 to be hereinafter described.

The blood sample analyzing apparatus is configured by an automatic microscope section A for imaging a magnified image of the auto focused blood specimen, an image processing section B for processing the imaged image and categorizing the white blood cells in the blood and counting of the white blood cells for each category, and a personal computer section C including an input part 30 for inputting various instructions for analysis and a display part 31 for displaying the imaged image, analysis result etc. The image processing section B and the personal computer section C may not be separate bodies and may be integrated with the function of the image processing section B incorporated in the personal computer section C.

Figure 3:
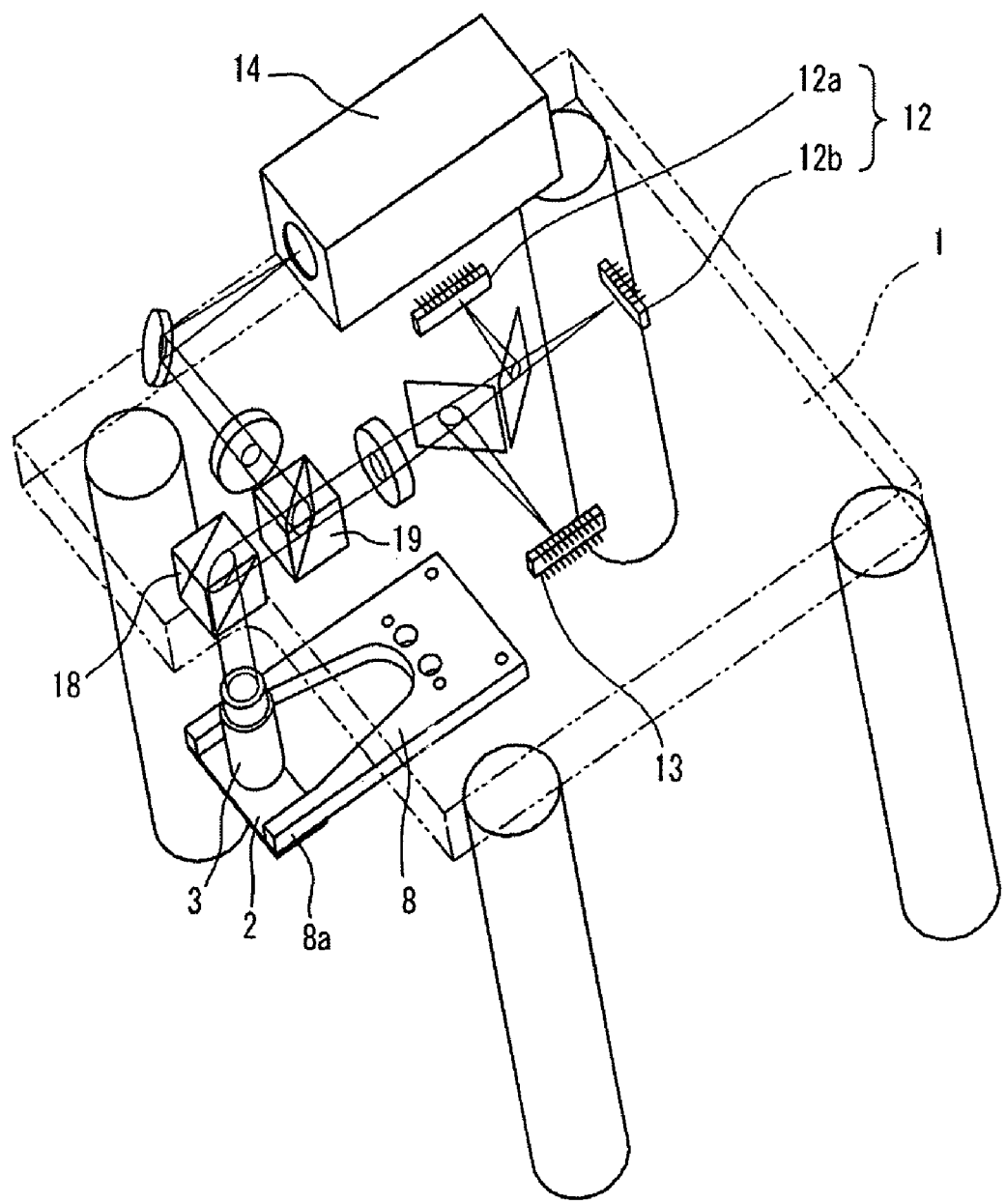
FIG. 3 is a perspective explanatory view of the main part of one embodiment of the automatic microscope of the present invention.

The automatic microscope A includes an optical system 3 for magnifying the image of the blood stretched thinly and applied over the slide glass 2 mounted on the XY stage 1 (see FIG. 3). The optical system 3 includes an objective lens and an ocular lens, where the objective lens is arranged on the slide glass 2 side, and the ocular lens is arranged on the CCD camera 14 side. The XY stage 1 is freely movable in the front and back or left and right directions (X direction and Y direction) by a stage mover assembly 41, and the optical system 3 is freely movable in the up and down direction (Z direction) by a focus adjuster 42. The stage mover assembly 41 includes two stepping motors (not shown) for X direction movement and Y direction movement, and is drive controlled by an XY stage drive circuit 5. The focus adjuster 42 includes a stepping motor (not shown) for Z direction movement, and is drive controlled by an optical system drive control 4.

A plurality of slide glasses 2 are stacked and accommodated in a slide cassette 7. The slide cassette 7 is conveyed by a conveying section (not shown) drive controlled by a cassette conveying drive circuit 6. A chuck section 8 (see FIG. 3) for gripping two locations in the vicinity of both ends in the longitudinal direction of the slide glass 2 is arranged on the XY stage 1 so as to freely move forward and backward with respect to the slide glass 2 accommodated in the slide cassette 7 that is stopped at a predetermined position. The chuck section 8 is moved forward towards the slide cassette 7 to grip the slide glass 2 by the opening and closing operation of a freely opening and closing nail part 8a formed at the distal end of the chuck section 8, and then the chuck section 8 is moved backward to pull out the slide glass 2 from the slide cassette 7 and arrange the slide glass at a predetermined position on the XY stage 1.

A lamp 9 serving as a light source is arranged below the slide glass 2, the light from which lamp 9 passes through the blood on the slide glass 2, and further through a half mirror 10 and an interference filter 11 arranged on the light path, and enters the sensor (light receiving part) 12 for auto focusing, the sensor (light receiving part) 13 for white blood cell (WBC) detection, and the CCD camera 14. The detection of white blood cells is performed by a white blood cell detection part 20, and the operation of auto focusing is performed by the auto focusing 21 based on the signal of the incident light. Specifically, the auto focusing 21 estimates a position of a focus of the optical system 3, which stays with respect to the slide glass 2. The auto focusing 21 includes a microcomputer and an A/D conversion circuit, and estimates the position of a focus of the optical system 3 based on the signal from the sensor 12. The auto focusing 21 may be configured by an electrical circuit for performing such estimation.

The image processing section B includes an A/D converting part 15, a characteristic extracting processor 16 and an automatic categorizing processor 17, and the imaging signal of the image imaged with the CCD camera 14 is converted from an analog signal to a digital signal by the A/D converting part 15. Various characteristic parameters of the white blood cells are calculated by the characteristic extracting processor 16 based on the digital signal. The characteristic parameters may be the area, number of nucleus, irregularities, color tone, concentration (unevenness) of the nucleus of the white blood cell; area, color tone, concentration (unevenness) of the cytoplasm of the white blood cell; area ratio, concentration ratio etc. of the nucleus and the cytoplasm that can be obtained based on the color signal (G, B, R) of the image. The types of white blood cells are automatically categorized and counted by the automatic categorizing processor 17 using the characteristic parameters. Specifically, the types of white blood cell can be gradually narrowed by sequentially comparing some of the characteristic parameters of the white blood cell, for example, with the criterion value defined in advance for each parameter. The imaged white blood cell are thereby categorized into the category of mature white blood cell such as lymphocytes, monocytes, acidophilic leukocyte, basophilic leukocyte, neutrophilic leukocyte (bacilliform, lobulated shape); category of immature white blood cell such as lymphoblast, mature granulocyte, atypical lymphocytes; and category of erythroblast.

In the following, a sequence of flow for auto focusing in the automatic microscope of the present embodiment will be described.

[Detection of White Blood Cell]

First, prior to auto focusing, detection of the white blood cell in the blood applied to the slide glass 2 is performed. This detection is performed using the sensor 13 described above. The sensor 13 is a line sensor and has a field of view of about 400 μm. The XY stage 1 is moved in the X direction and the Y direction (see FIG. 2(a)), so that the sensor 13 scans the slide glass 2 from one end to the other end in the longitudinal direction in a substantially zigzag manner. The distance D in the longitudinal direction of the slide glass 2 of a substantially zigzag scan is normally about 300 μm in terms of increasing the scanning efficiency while preventing detection leakage, and the dimension H in the width direction of the slide glass 2 of the scan is normally about 16 mm as the width of the slide glass 2 is generally about 26 mm.

Figure 2:
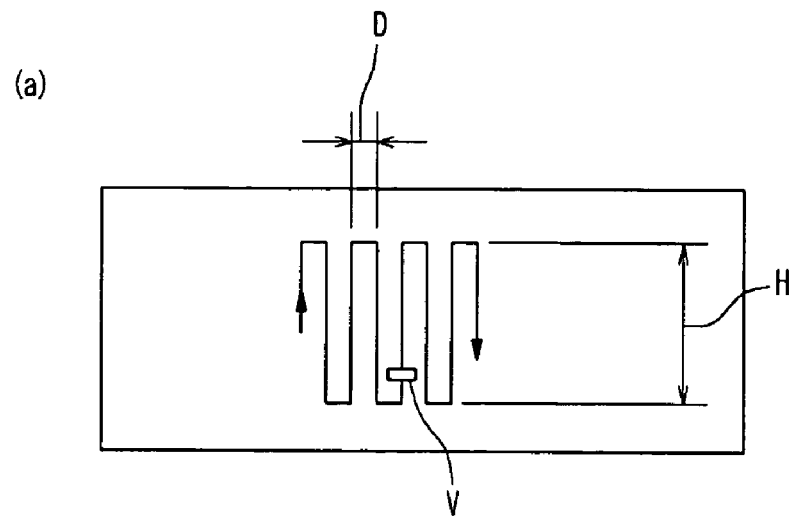
FIG. 2 is a view explaining the principle of white blood cell detection, where (a) shows a scanning pattern of the specimen on the slide glass, (b) shows a field of view of the line sensor and the hematocytes at the periphery thereof, and (c) shows the detection signal of the line sensor.
Figure 2:
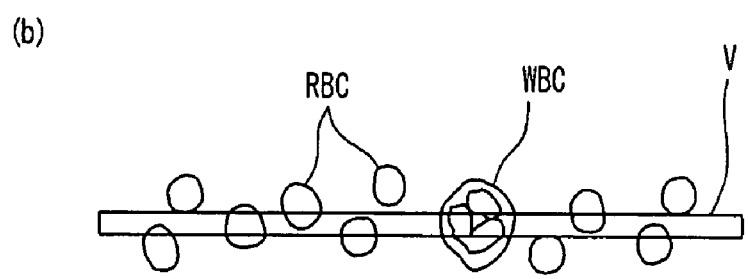
Figure 2:
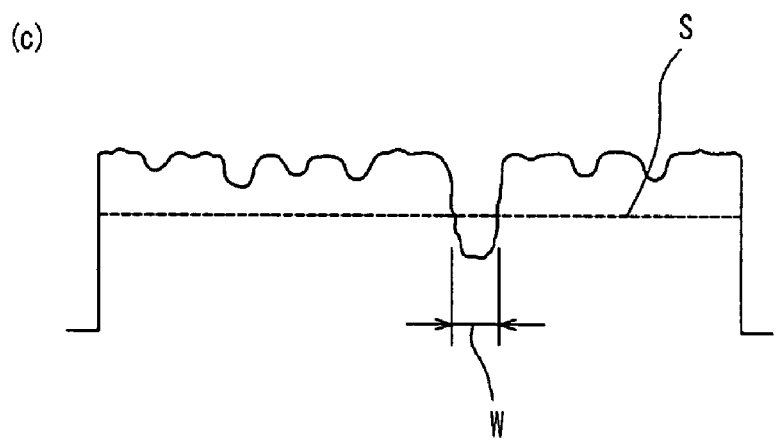

Since the nucleus of the white blood cell WBC greatly absorbs the red color component of the light, the white blood cell WBC and the red blood cell RBC can be easily distinguished by detecting the red color component. FIG. 2(b) shows a case of when the white blood cell WBC is present in the field of view V of the line sensor, in which case the red color component of the signal detected by the line sensor is less than or equal to the reference value S at the location where the white blood cell WBC is present as shown in FIG. 2(c). The white blood cell in the blood can be detected by using this phenomenon. A check can be made on whether or not the portion emitting such signal is the white blood cell by detecting the width W in which the red color component of the signal becomes less than or equal to the reference value S.

[Auto Focusing (in Time of No Vibration)]

When a relative vibration is produced between the slide glass 2 and the optical system 3, the automatic microscope of the present embodiment does not perform auto-focusing operation after the vibration is converged but performs the auto focusing operation while vibration is produced. First, the auto focusing operation of when the vibration of a size that influences the image quality is not present will be described.

FIG. 3 is a perspective explanatory view of the main part of one embodiment of the automatic microscope of the present invention, where the direction of the light that has passed the slide glass 2 and the optical system 3 is changed by a prism mirror 18, and further divided by a half mirror 19 into a light directed to the CCD camera 14 and a light directed to the sensors 12, 13. The sensor 12 is a sensor (line sensor) for auto focusing, and consists of two sensors 12a and 12b. The sensor 13 is a sensor (line sensor) for white blood cell detection.

Figure 4:
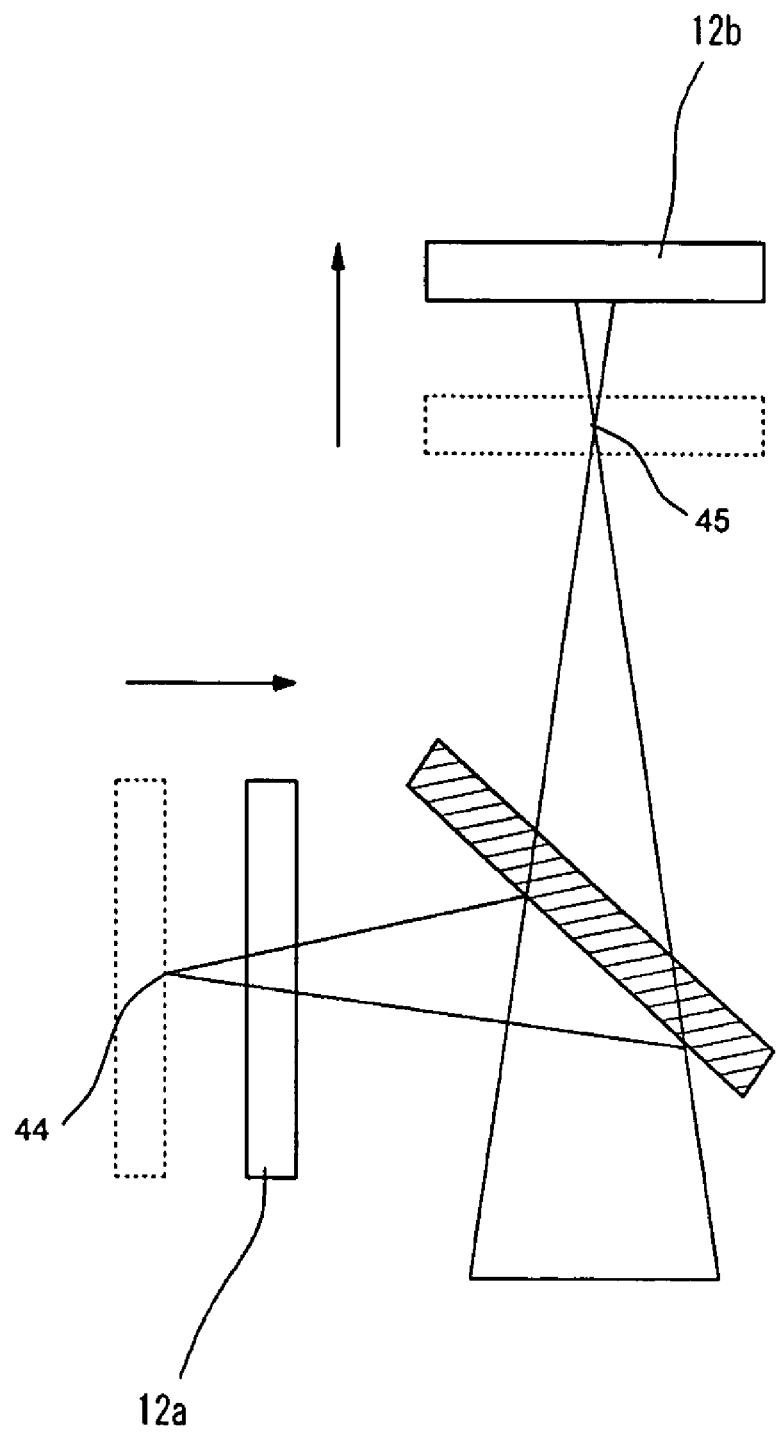
FIG. 4 is a view explaining the arrangement of two sensors for focusing.

As shown in FIG. 4, if the focus of the slide glass 2 side of the optical system 3 is focused on the slide glass 2, one sensor 12a of the two sensors 12a, 12b for auto focusing is arranged on the front side (side closer to the optical system 3 on the light path) of the focal position 44 (position where the focus of the CCD camera 14 side of the optical system 3 is focused), and the other sensor 12b is arranged on the rear side (side away from the optical system 3 on the light path) of the focal position 45 (position where the focus of the CCD camera 14 side of the optical system 3 is focused).

Figure 5:
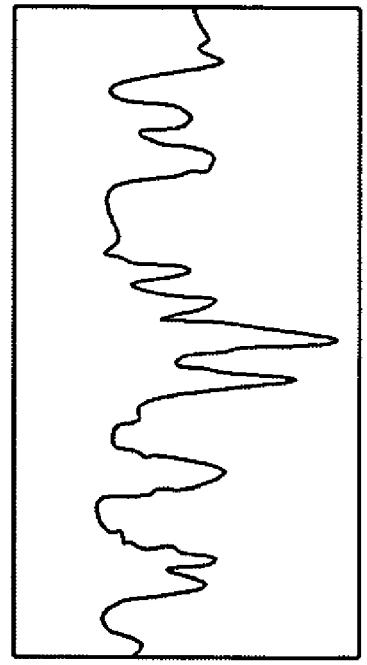
FIG. 5 is a view showing a signal waveform obtained by the sensor for focusing, where (a) shows the signal waveform of the sensor at a position shifted from the focal position, and (b) shows the signal waveform of the sensor at the focal position.
Figure 5:

The signal waveform of the sensor at the position in focus, that is, focused has a so-called clear contrast, and thus becomes a waveform of large amplitude, as shown in FIG. 5(b), whereas the signal waveform of the sensor at the position out of focus, that is, not focused has an unclear contrast, and thus becomes a waveform that is overall smooth and has a small amplitude, as shown in FIG. 5(a). About 2000 picture elements are usually arranged in a line in the line sensor, but taking into consideration the value obtained by integrating the signal difference of the adjacent picture elements of the line sensor (hereinafter, the integrated value is referred to as differential integrated value), the differential integrated value becomes larger as the focus becomes more precise.

Figure 6:
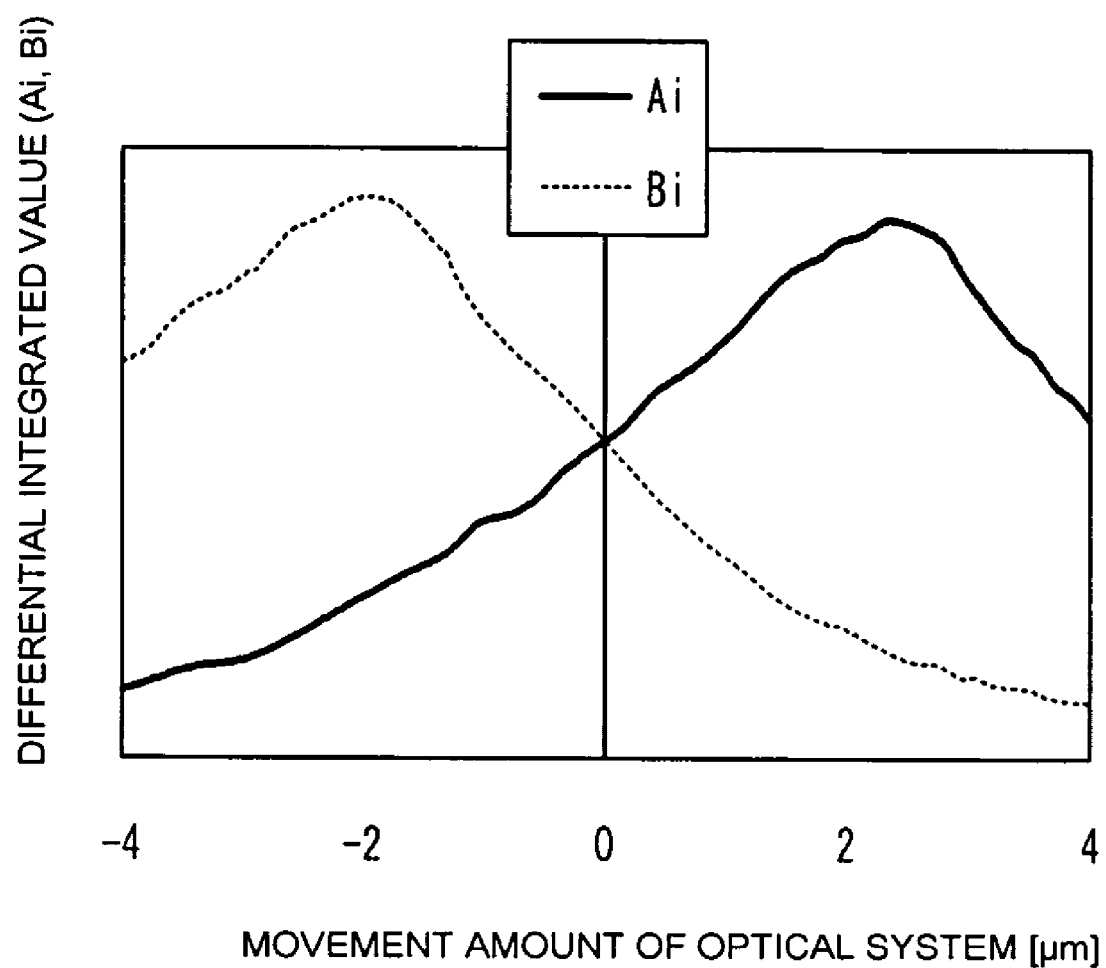
FIG. 6 is a view showing the relationship between a differential integrated value, which is a value obtained by integrating the difference in the signals of the adjacent picture elements for the two sensors for focusing, and the movement amount of the optical system.

FIG. 6 shows the differential integrated values of the two sensors with the movement amount of the optical system in the horizontal axis. Ai shows the differential integrated value of the sensor 12a, and Bi shows the differential integrated value of the sensor 12b. In a case of the sensor 12a, the focus of the CCD camera 14 side is focused when the optical system 3 is moved away from the slide glass by about 2 μm from the state in which the focus of the slide glass 2 side of the optical system 3 is focused on the slide glass 2, and the differential integrated value Ai becomes the peak value. In a case of the sensor 12b, the focus of the CCD camera 14 side is focused when the optical system 3 is moved closer to the slide glass by about 2 μm from the state in which the focus of the slide glass 2 side of the optical system 3 is focused on the slide glass 2, and the differential integrated value Bi becomes the peak value.

Figure 7:
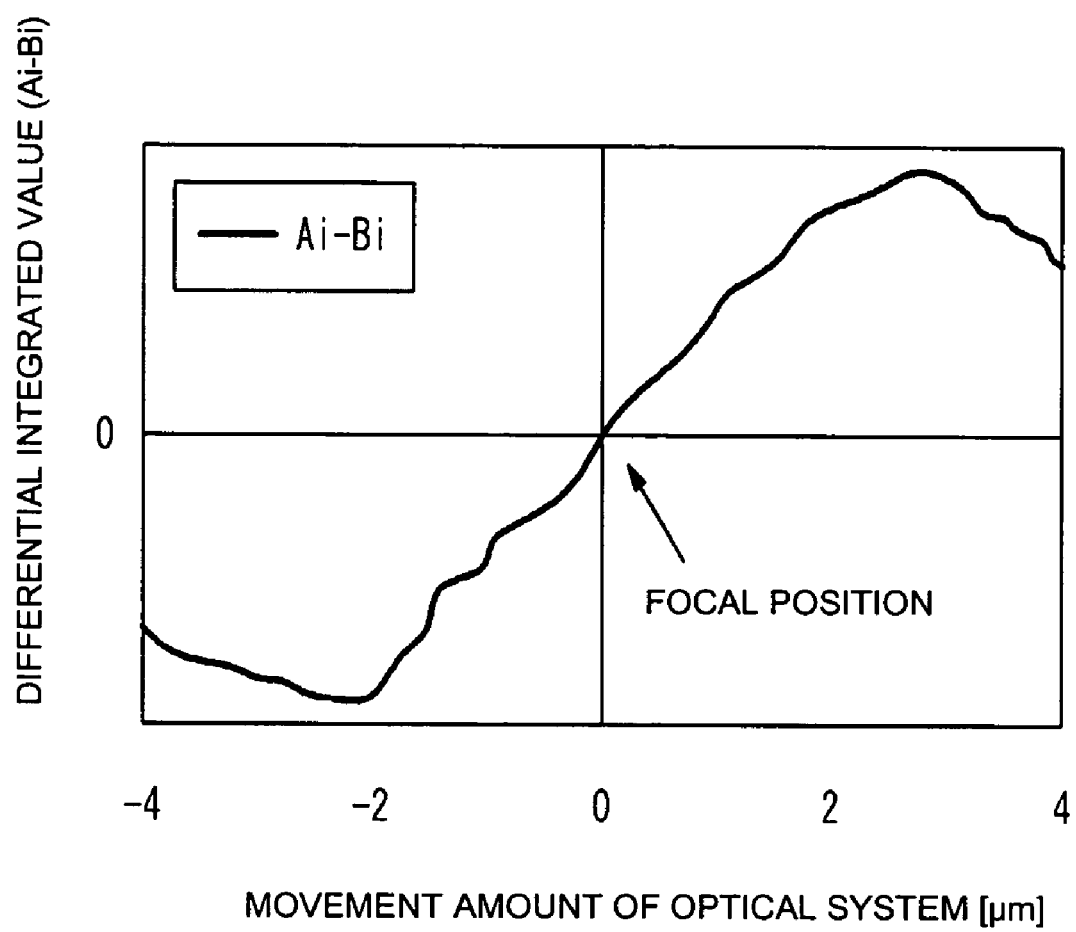
FIG. 7 is a view showing the relationship between the difference in the differential integrated value for the two sensors for focusing and the movement amount of the optical system.

If only one sensor is arranged, for example, if only the sensor 12a is arranged, determination cannot be made to which direction the optical system 3 should be moved to have the differential integrated value Ai as the peak value, and thus the optical system 3 must be moved in a trial and error manner for focusing, which takes a substantial amount of time for auto focusing. On the other hand, if two sensors of the above arrangement are used, auto focusing is reliably performed in a short period of time by obtaining the difference (Ai−Bi) in the differential integrated values of the two sensors as shown in FIG. 7. That is, auto focusing can be easily performed by moving the optical system 3 to the direction that approaches Ai−Bi=0.

[Auto Focusing (in Time of Vibration)]

As shown in FIG. 7, the value of (Ai−Bi) in a certain state takes one value, but the value of (Ai−Bi) varies at substantially the same period as the vibration since relative vibration is produced between the slide glass mounted on the XY stage 1 and the lens of the microscope when, for example, the XY stage 1 is moved for white blood cell detection and then stopped after detection, or when a person or an object contacts the table, the base and the like where the automatic microscope is arranged. For example, upon stopping the XY stage 1 that is moving, the residual vibration occurs at the XY stage (that is, the optical system 3 vibrates with respect to the slide glass 2), and the automatic microscope section A of the present embodiment starts the movement of the optical system 3 before the residual vibration converges using the value of (Ai−Bi).

Figure 8:
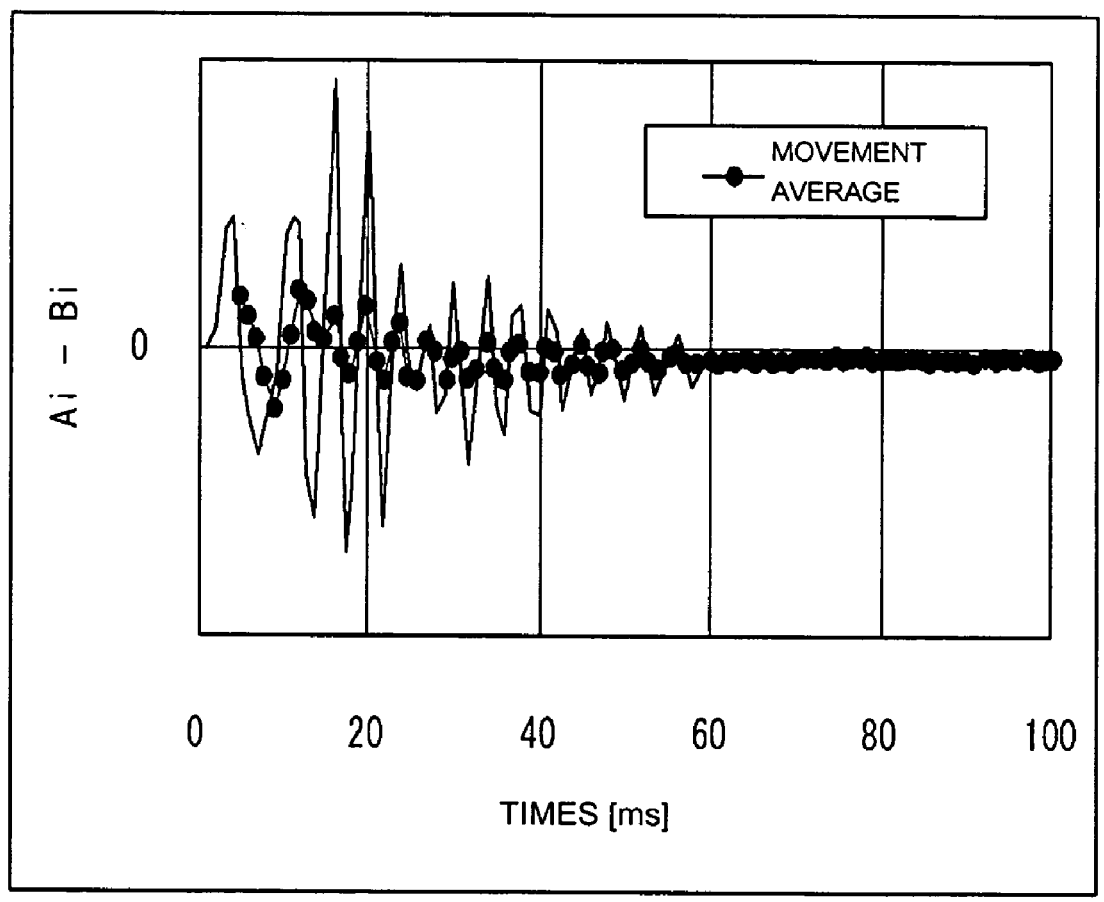
FIG. 8 is a view showing the residual vibration from immediately after the stage is stopped.

FIG. 8 shows the value of (Ai−Bi) from immediately after the XY stage is stopped after the white blood cell detection in the state in which the focus of the slide glass 2 side of the optical system 3 is focused on the slide glass 2. Since the value of (Ai−Bi) moves between positive and negative until the residual vibration converges, auto focusing cannot be performed by determining the movement direction on the Z-axis of optical system based on such value during the vibration.

However, since the value of (Ai−Bi) varies by substantially the same amount to the positive side and the negative side with the value in time of no vibration (value of when vibration does not occur) as the center, the value of (Ai−Bi) of when vibration converges can, although schematically, estimated by movement averaging the value of (Ai−Bi) so as to include one period of such variation. In other words, the position of the focus of when the vibration converges can be estimated, and the optical system 3 can be moved so that the focus is focused on the specimen on the slide glass, that is, so that the value of (Ai−Bi) of when the vibration converges becomes 0 while the optical system 3 is relatively vibrating with respect to the slide glass 2 by having the focus adjuster 42 driven by the optical system drive circuit 4 based on the estimated focus position.

The period of the relative vibration between the slide glass and the lens of the microscope differs depending on the weight or material of the apparatus, natural vibration frequency determined by the assembly of the equipment and the like. The movement average is obtained by obtaining the natural vibration frequency of the designed automatic microscope, and averaging the value for the period of such vibration. If the period of the vibration of the automatic microscope is 5 msec, for example, the value of (Ai−Bi) is calculated for every 1 msec, and the nearest five values immediately nearby are movement averaged to movement average the value for the previous one period, whereby the value (value in time of vibration convergence) of (Ai−Bi) can be determined whether positive or negative from the obtained movement average value. By moving the optical system 3 based on the movement average value, the auto focusing direction is accurately found irrespective of whether or not in vibration, and the auto focusing can be started. The position of the focus can be estimated even in time of when the vibration is large or close to 20 msec shown in FIG. 8. The auto focusing is completed according to the reduction (convergence) of the vibration by repeating the calculation of the relevant movement average value and the movement of the optical system 3 based on the value. After detected by the auto focusing 21 that the size of the vibration of the optical system 3 has become smaller than the predetermined value, imaging of the specimen by the CCD camera 14 and transmission of the imaging signal to the image processing section B are performed.

Thus, even if the relative vibration is produced between the slide glass mounted on the XY stage and the lens of the microscope when the XY stage is moved or when a person or an object contacts the table, the base and the like on where the automatic microscope is arranged, the automatic microscope of the present invention performs the auto focusing operation while avoiding the influence of the vibration during the vibration, and thus the time required for auto focusing is greatly reduced compared to the conventional automatic microscope in which auto focusing is started after the vibration is converged. Specifically, conventionally, after detecting the white blood cell and stopping the XY stage, about 50 msec is waited until the residual vibration is converged and then the auto focusing is performed after the vibration is converged, whereas in the present embodiment, the auto focusing operation is performed while the vibration is being produced, and thus the time required for the auto focusing is reduced by at least the waiting time. As a result, the processing speed becomes faster when imaging the magnified image of the specimen and performing various processes based on the obtained image.

In the above embodiment, focusing is performed by moving the optical system 3 in the up and down direction, but the XY stage 1 itself may be moved in the up and down direction. Furthermore, focusing may be performed by moving only the predetermined lens of the lenses arranged in the optical system 3 in the up and down direction. The period of the relative vibration between the slide glass and the lens of the microscope may be measured at the time of assembly of the automatic microscope, and the number (how many points immediately near the movement average to obtain) of the values for obtaining the time interval and the movement average value for calculating the value of the ($A_i-B_i$) based on the measurement value may be determined; or the values of ($A_i-B_i$) for 8 msec or more may be continuously obtained each time the XY stage is stopped, and the value may be FFT frequency analyzed to obtain the frequency of the maximum intensity (amplitude) and calculate the length of one period, and the number of values for obtaining the time interval and the movement average value for calculating the value of ($A_i-B_i$) may be determined based on the length of one period.

In the above embodiment, the estimation of the position of the focus of the optical system 3 by the auto focusing 21 and the movement of the optical system 3 by the optical system drive circuit 4 are performed while the relative vibration is produced between the optical system 3 and the slide glass 2, but only the estimation of the focus of the optical system by the auto focusing 21 may be performed while the relative vibration is produced between the optical system 3 and the slide glass 2, and the movement of the optical system 3 may be performed immediately after the vibration of the optical system 3 has substantially converged.

Moreover, in the above embodiment, two sensors are used as sensors for auto focusing, but the position of the focus of the optical system 3 may be adjusted using one sensor. The line sensor is used as the sensors, but an area sensor may also be used.

It should be apparent to those skilled in the art that the present invention may be embodied in many other specific forms without departing from the spirit or scope of the invention. Therefore, the present invention is not to be limited to the details given herein, but may be modified within the scope and equivalence of the appended claims.

The invention claimed is:

1. A microscope comprising:
a stage for holding a sample;
a stage mover assembly for moving the stage;
an optical system for magnifying the sample on the stage;
a focus adjuster for adjusting a focus of the optical system on the sample;
an optical detector for detecting light through the optical system;
a position estimator for estimating a position of the focus of the optical system with respect to the sample, based on the light detected by the optical detector before a relative vibration between the optical system and the sample converges, the relative vibration being caused by a movement of the stage holding the sample by the stage mover assembly; and
a controller for controlling the focus adjuster to start adjusting the focus of the optical system on the sample before the relative vibration converges, based on the position of the focus estimated by the position estimator.

2. The microscope of claim 1,
wherein the focus adjuster moves the optical system.

3. The microscope of claim 1,
wherein the optical detector comprises an optical sensor comprising a plurality of picture elements.

4. The microscope of claim 3,
wherein the optical sensor comprises a line sensor.

5. The microscope of claim 3,
wherein the position estimator estimates the position of the focus of the optical system based on differences In signal intensities of adjacent picture elements.

6. The microscope of claim 1,
wherein the optical detector comprises two optical sensors, an optical distance between one of the optical sensors and the optical system being smaller than an optical distance between a focal position of the optical system and the optical system, and an optical distance between another of the optical sensors and the optical system being larger than an optical distance between the focal position of the optical system and the optical system.

7. The microscope of claim 6,
wherein the position estimator calculates a first value based on signals from one of the optical sensors and a second value based on signals from the other of the optical sensors, and estimates the position of the focus of the optical system based on the first and the second values.

8. The microscope of claim 7,
wherein the position estimator calculates a moving average difference of the first value and the second value, and estimates the position of the focus of the optical system based on the moving average.

9. The microscope of claim 1, further comprising:
a light source located under the sample;
wherein the optical detector detects light from the light source through the optical system.

10. The microscope of claim 1,
wherein the relative vibration comprises a residual vibration that occurs after the stage mover assembly stops the movement of the stage.

11. An analyzer comprising:
the microscope of claim 1; and
an analyzing section for analyzing the sample based on an image of the sample magnified by the microscope.

12. A microscope comprising:

a stage for holding a slide glass comprising a smeared sample;

a stage mover assembly for moving the stage;

an optical system for magnifying a predetermined component included in the smeared sample on the stage;

a focus adjuster for adjusting a focus of the optical system on the component;

an optical detector for detecting light through the optical system;

a position estimator for estimating a position of the focus of the optical system with respect to the component based on the light detected by the optical detector before a relative vibration between the optical system and the component converges, the relative vibration being caused by a movement of the stage holding the slide glass by the stage mover assembly; and a controller for controlling the focus adjuster to start adjusting the focus of the optical system on the component before the relative vibration converges, based on the position of the focus estimated by the position estimator.

13. The microscope of claim 12, further comprising:

a component detector for detecting the component while the stage is moving.

14. The microscope of claim 13, wherein the sample comprises blood and the component comprises a white blood cell.

15. An analyzer, comprising:

the microscope of claim 13; and an analyzing section for analyzing the component based on an image of the component magnified by the microscope.

16. The microscope of claim 12, wherein the relative vibration comprises a residual vibration that occurs after the stage mover assembly stops the movement of the stage.

17. The microscope of claim 12, wherein the stage mover assembly moves the stage horizontally.

18. An auto focusing method for a microscope, comprising:

locating a sample held on a stage under an optical system for magnifying the sample;

estimating a position of a focus of the optical system with respect to the sample before a relative vibration between the optical system and the sample converges, the relative vibration being caused by a movement of the stage holding the sample; and starting to adjust a focus of the optical system on the sample before the relative vibration converges, based on the estimated position of the focus of the optical system.

19. The auto focusing method of claim 18, further comprising:

detecting light through the optical system;

wherein the position of the focus of the optical system is estimated by the light detected through the optical system.

20. The auto focusing method of claim 18, further comprising:

detecting a component of the smeared sample;

wherein the estimating of the position of the focus is performed so as to estimate the position of the focus of the optical system with respect to the component; and wherein the starting of the adjustment of the focus is performed so as to start adjusting the focus of the optical system on the component.

* * * * *